Patented Apr. 8, 1924.

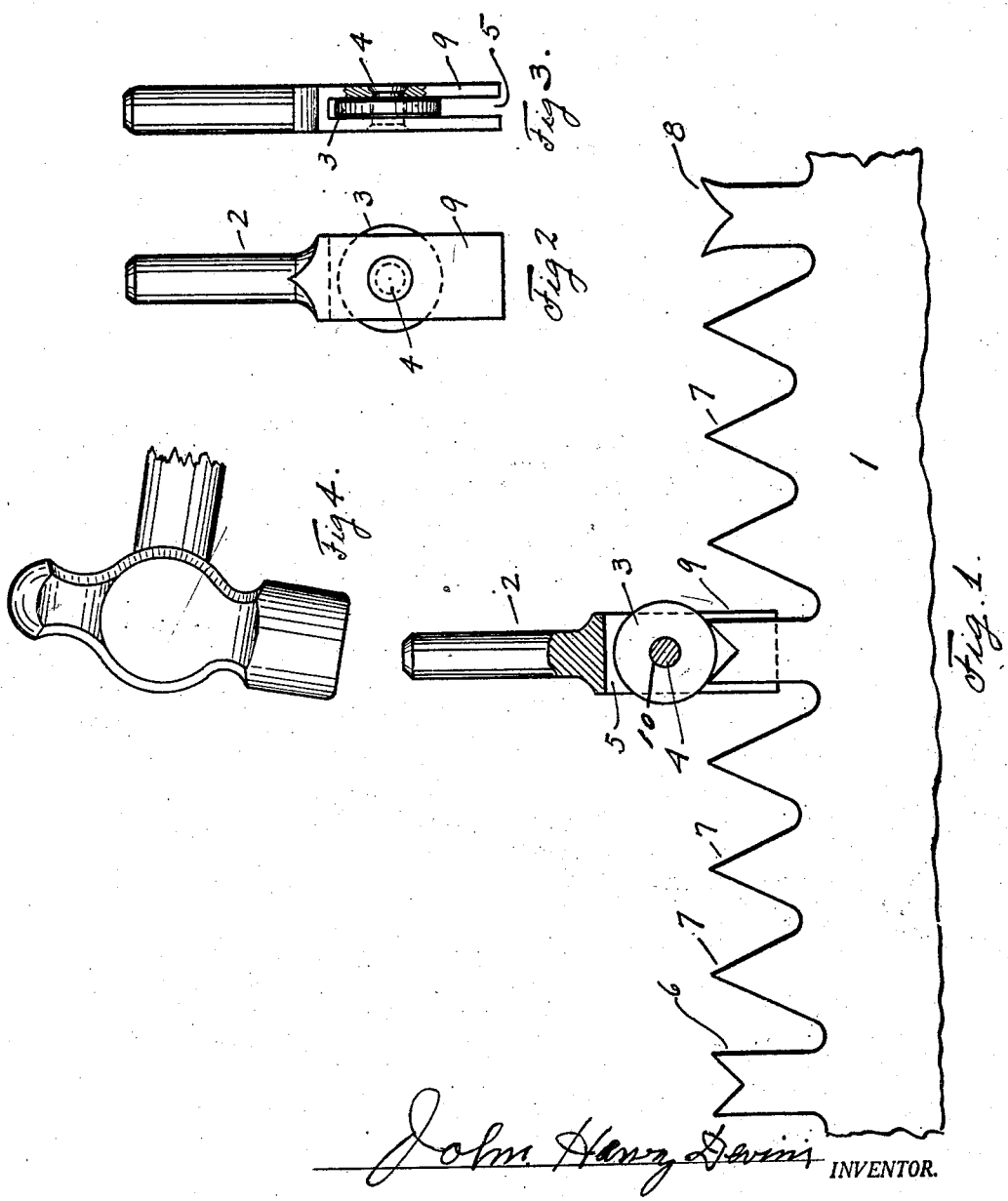

1,489,485

UNITED STATES PATENT OFFICE.

JOHN HENRY DEVINI, OF CLEVELAND, TEXAS.

DRAG SPREADER.

Application filed March 19, 1923. Serial No. 626,233.

*To all whom it may concern:*

Be it known that I, JOHN HENRY DEVINI, a citizen of the United States, residing at Cleveland, in the county of Liberty and State of Texas, have invented a new and useful Drag Spreader, of which the following is a specification.

My object was to invent a simple tool (one that unskilled labor could handle efficiently) that would spread the drag-teeth, or rakers, of a cross-cut saw, in a uniform manner; spreading one raker with a single operation.

The mechanism is illustrated in the drawing, in which Figure 1 represents a partial longitudinal sectional view showing the operation of the drag-spreader. Figure 2 represents a front view. Figure 3 represents a side view; and Figure 4 represents hammer used in operating spreader: Figures 1 and 4 combined, being a detailed view of manner of operating. Similar numerals refer to similar parts throughout the several views.

Figure 1 represents tool on top of drag, the spreading is done by means of the steel wheel No. 3. No. 4 is the round hole through wheel and body portion, to receive axle which is No. 10. No. 5 is slot with one side removed. No. 6 is a drag before spreading. No. 7 are teeth of saw. No 8 is drag after spreading with spreader. No. 9 designates the sides of the slot 5.

Figure 2, No. 2 represents shaft of tool. No. 3 shows spreader in the slot, ready for operation. No. 4 is hole through body portion and wheel. No. 10 is the axle therein. No. 9 shows jaw of tool which fits over drag, as shown in Figure 1.

Figure 3, No. 3 shows wheel of spreader in slot. No 4 is hole through body of spreader and wheel. No. 9 designates the sides of the slot. No. 10 is the axle of the wheel.

Figure 4 is hammer with which to strike spreader.

I claim:

A drag spreader of the character described, a handle portion provided with an anvil head, a bifurcated body portion provided with a hole in each furcation to receive an axle, a wheel, an axle passing through the wheel and into the said holes in order to provide journals for the wheel in said bifurcated body portion.

In testimony whereof I have signed my name to this specification in the presence of two subscribing witnesses.

JOHN HENRY DEVINI.

Witnesses:
R. G. RIGGS,
C. N. SMITH.